E. B. WADDELL, Jr.
AUTOMATIC SAFETY VALVE.
APPLICATION FILED NOV. 4, 1913.

1,093,899.

Patented Apr. 21, 1914.

Witnesses
J. C. Simpson
A. Ellison

Inventor
E. B. Waddell, Jr.

By Charles Chandler
Attorneys

COLUMBIA PLANOGRAPH CO., WASHINGTON, D. C.

UNITED STATES PATENT OFFICE.

EDWARD BRAYNT WADDELL, JR., OF WILLIAMSON, WEST VIRGINIA, ASSIGNOR OF ONE-THIRD TO HAWTHORNE A. GOODLOE AND ONE-THIRD TO MONTEZUMA WHITE, BOTH OF WILLIAMSON, WEST VIRGINIA.

AUTOMATIC SAFETY-VALVE.

1,093,899.  Specification of Letters Patent.  Patented Apr. 21, 1914.

Application filed November 4, 1913.  Serial No. 799,223.

*To all whom it may concern:*

Be it known that I, EDWARD B. WADDELL, Jr., a citizen of the United States, residing at Williamson, in the county of Mingo, State of West Virginia, have invented certain new and useful Improvements in Automatic Safety-Valves; and I do hereby declare the following to be a full, clear, and exact description of the invention, such as will enable others skilled in the art to which it appertains to make and use the same.

This invention relates to valves and has special reference to a safety valve of the type wherein, when the pressure in a gas or other fluid pressure line drops below a certain amount the valve will automatically close.

The principal object of the invention is to improve and simplify the general construction of devices of this character.

A second object of the invention is to provide a novel means whereby a valve will be automatically released from open position to drop into closed position when the pressure in the line drops below a predetermined point.

A third object of the invention is to provide a novel arrangement which will permit of the reopening of the valve and locking the same in opened position only when the pressure has again reached the proper point.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—

Figure 1:
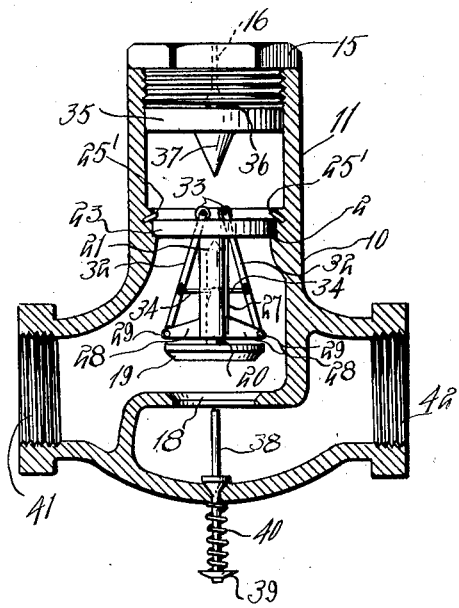
Figure 2:
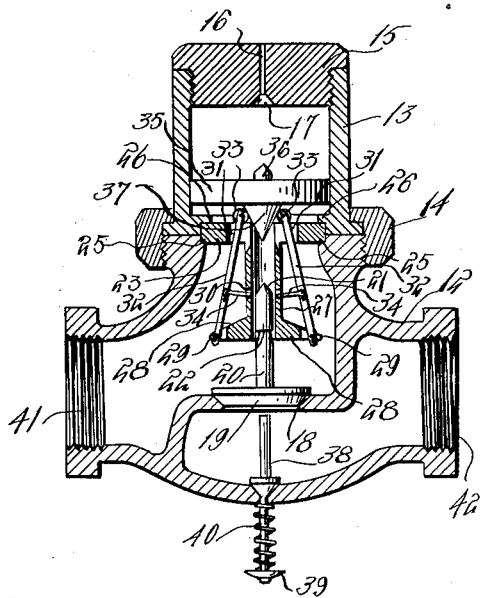
Figure 3:
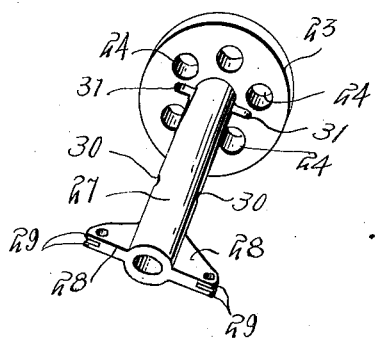
Figure 4:
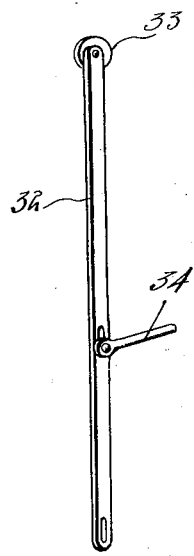

Figure 1 is a section through a valve constructed in accordance with this invention, the same being shown in its open position. Fig. 2 is a similar view of a slightly modified form of valve, the same being shown in its closed position. Fig. 3 is a detail of one of the portions of a locking device used herewith. Fig. 4 is a detail of a second part of this locking device.

In carrying out the objects of this invention there may be provided either an integral valve body 10 and bonnet 11 as indicated in Fig. 1 or the valve body may be made as at 12 in Fig. 2 and the bonnet 13 be made separate therefrom and secured to the valve body by means of the nut 14. In either case the upper end of the bonnet is provided with a closing plug 15 having a bleed opening 16 in the top thereof. This bleed opening terminates at its lower end in a suitable valve seat 17 for purposes hereinafter to be described. The valve body in each instance is provided with a suitable seat 18 and within the body is a disk valve 19 of the ordinary type, the latter being ground to properly fit the seat 18. This disk valve 19 is provided with a stem 20 the upper end of which is pointed as indicated at 21 and intermediate the length of this stem there is provided annular grooves 22 for purposes hereinafter to be described.

Extending across the valve at the top of the body and at the bottom of the bonnet is a diaphragm 23 provided with a suitable opening 24. This diaphragm is supported in each instance on a shoulder 25 beneath the diaphragm and in the form shown in Fig. 1 it is held on the shoulder by means of pins or plugs 25′. In the form shown in Fig. 2 the bonnet 13 is provided with a projecting flange 26 which forms the shoulder resting on the top of the diaphragm and thus holding it in position.

Depending from the diaphragm 23 is a tubular stem 27 at the lower end whereof is provided a pair of outwardly extending arms 28 carrying at their outer ends the ears 29. Between the diaphragm 23 and the arm 29 the stem 27 is provided with oppositely disposed openings 30. In the diaphragm 23 is a slot 31 which is arranged diametrically of the diaphragm. Pivoted to the ears 29 are levers 32 which extend through the slot 31 and carry at their upper ends the rollers 33. Intermediate their ends these levers are provided with locking pins 34 which pass through the opening 31 and are so arranged that when the valve stem 20 is moved up into the hollow stem 27 the locking pins 34 will engage in the groove 22 and thus hold the valve disk 19 in a raised position off the seat 18.

Slidably mounted in the bonnet of the valve is a piston 35 which carries on its upper side a small valve 36 adapted to seat, when the piston is raised, in the valve seat 17. Beneath the piston 35 there is provided a wedge member 37 which is adapted, when the piston 35 drops, to enter between the rollers 33 and force the levers 32 apart so that the locking pins 34 are released from the groove 22 and consequently the valve 19 can drop.

Extending through the bottom of the valve body and in alinement with the valve stem 20 is a plunger 38 which has on its lower end outside of the body a head 39. Between this head 39 and the valve body is a spring 40 which surrounds the plunger and normally holds the latter in a depressed position. The valve body is provided with the usual connection 41 and 42 for the inlet and outlet respectively of the fluid under pressure.

In the operation of the device when it is desired that fluid under pressure shall pass from the inlet to the outlet the plunger 38 is actuated by pressing upward upon the head 39 so that the valve 19 is raised to the position shown in Fig. 1. At this time, if the pressure of the fluid be sufficient, the piston 35 will have been raised and the valve 36 will have seated on the valve seat 17. It will be observed that the weight of the piston 35 is so adjusted that it only rises when the pressure is sufficient for the desired purpose. Now, if the pressure drops below the point, the weight of the piston 35 causes the latter to drop and the member 37 striking between the rollers 33 releases the valve 19 in the manner hereinbefore described. This causes the shutting off of communication between the inlet 41 and outlet 42. If the pressure continues at this low point the piston 35 will remain in its lowest position and consequently the locking pins 34 will be in their outward position. The action of the plunger 38 upon the valve 19 can only, under these conditions, momentarily lift said valve and as soon as pressure on the head 39 is released the valve 19 will again seat. It is thus impossible to open the valve 19 permanently unless the pressure in the valve body is sufficient to raise the plunger 35 and permit the pins 34 to engage in the groove 22.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:

1. In combination with a valve body provided with a bonnet and a valve seat; a valve disk movable to and from said seat, a stem projecting from said disk and provided with a notch, a diaphragm extending across the lower end of said bonnet and having openings therein, a tubular stem depending from said diaphragm and receiving said valve stem, said tubular stem having a lateral opening therein, a locking pin slidable in said lateral opening and adapted to engage the notch, a piston slidable in said bonnet and means operable upon movement of the piston downward to withdraw said locking pin.

2. In combination with a valve body provided with a bonnet and a valve seat; a valve disk movable to and from said seat, a stem projecting from said disk and provided with a notch, a diaphragm extending across the lower end of said bonnet and having openings therein, a tubular stem depending from said diaphragm and receiving said valve stem, said tubular stem having a lateral opening therein, a locking pin slidable in said lateral opening and adapted to engage the notch, a lever having one end projecting through said diaphragm, a piston slidable in said bonnet, and means carried by the piston for engaging the lever to withdraw the pin from the notch when the piston falls.

3. In combination with a valve body provided with a bonnet and a valve seat; a valve disk movable to and from said seat, a stem projecting from said disk and provided with a notch, a diaphragm extending across the lower end of said bonnet and having openings therein, a tubular stem depending from said diaphragm and receiving said valve stem, said tubular stem having a lateral opening therein, a locking pin slidable in said lateral opening and adapted to engage the notch, a lever carrying said pin and having one end projecting through said diaphragm, a piston slidable in said bonnet, and a wedge projecting from said piston and adapted to engage said lever and withdraw the pin from the notch when the piston falls.

In testimony whereof, I affix my signature, in the presence of two witnesses.

EDWARD BRAYNT WADDELL, Jr.

Witnesses:
W. E. SLEDGE,
O. K. SHINNOTT.

---

Copies of this patent may be obtained for five cents each, by addressing the "Commissioner of Patents, Washington, D. C."